US006865560B1

(12) United States Patent
Sansone et al.

(10) Patent No.: US 6,865,560 B1
(45) Date of Patent: *Mar. 8, 2005

(54) METHOD AND SYSTEM FOR REPORTING CARRIER DELIVERY STATUS TO A MAILER

(75) Inventors: Ronald P. Sansone, Weston, CT (US); Susan Garvey, Fairfield, CT (US); Daniel F. Dlugos, Huntington, CT (US); Robert A. Law, Ridgefield, CT (US); Michael W. Wilson, Trumbull, CT (US)

(73) Assignee: Pitney Bowes Inc., Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/473,589

(22) Filed: Dec. 28, 1999

(51) Int. Cl.[7] .......................... G06F 17/00; G07B 17/02

(52) U.S. Cl. ....................... 705/404; 705/401; 705/402; 705/403; 705/410; 705/416; 700/115

(58) Field of Search ................................ 705/410, 403, 705/401, 404, 407, 408, 60, 406, 62; 380/51, 55, 59; 177/25.13, 25.15; 235/375, 380; 700/221, 224, 227; 283/67; 209/584, 900

(56) References Cited

U.S. PATENT DOCUMENTS

| | | | | | |
|---|---|---|---|---|---|
| 4,757,456 | A | * | 7/1988 | Benghiat | 705/412 |
| 5,309,363 | A | * | 5/1994 | Graves et al. | 705/403 |
| 5,510,992 | A | * | 4/1996 | Kara | 364/464.02 |
| 5,606,507 | A | * | 2/1997 | Kara | 364/464.18 |
| 5,857,184 | A | * | 1/1999 | Lynch | 707/4 |
| 5,869,819 | A | * | 2/1999 | Knowles et al. | 235/375 |
| 5,880,451 | A | * | 3/1999 | Smith et al. | 235/462.1 |
| 6,005,945 | A | * | 12/1999 | Whitehouse | 380/51 |
| 6,013,878 | A | * | 1/2000 | Schwartz et al. | 177/25.13 |
| 6,029,177 | A | * | 2/2000 | Sadiq et al. | 707/201 |
| 6,081,827 | A | * | 6/2000 | Reber et al. | 709/200 |
| 6,125,388 | A | * | 9/2000 | Reisman | 709/218 |
| 6,134,561 | A | * | 10/2000 | Brandien et al. | 707/104 |
| 6,285,916 | B1 | * | 9/2001 | Kadaba et al. | 700/222 |
| 6,394,354 | B1 | * | 5/2002 | Wilz et al. | 235/472.01 |
| 6,411,891 | B1 | * | 6/2002 | Jones | 701/201 |

FOREIGN PATENT DOCUMENTS

| | | | | |
|---|---|---|---|---|
| EP | 0 371 607 A2 | * | 10/1989 | H04L/12/54 |
| WO | WO 9613015 | * | 5/1996 | |

OTHER PUBLICATIONS

Robert J. Bowman, B'gosh, it's Oshkosh! The popular children's clothing wholesaler finds that keeping close tabs on shipment can pay off in a number of ways. Chilton's Distribution, v88, n2, p44.*

* cited by examiner

*Primary Examiner*—Frantzy Poinvil
*Assistant Examiner*—Debra Charles
(74) *Attorney, Agent, or Firm*—Ronald Reichman; Angelo N. Chaclas

(57) ABSTRACT

A method and system for providing a delivery confirmation service to a mailer who uses a postage meter to pay the postage for mailing a mail piece. The mailer applies a shipping label containing an identification number on the mail piece to identify the mail piece and the mailer. The identification number is retrieved by the postage meter which sends the identification number to a data processing center or a meter refill data center for processing. Upon receiving the identification number, the data processing center sends a shipping file to the carrier. When the mail piece is delivered, a message regarding the delivery status of the mail piece is sent to the carrier by the mail deliverer. With the shipping file and the delivery status message, the carrier makes available the delivery status of the mail piece to the data processing center which stores the delivery status. Upon request, the data processing center communicates at least a portion of the delivery status to the mailer via a meter refill system.

16 Claims, 8 Drawing Sheets

METHOD AND SYSTEM FOR REPORTING CARRIER DELIVERY STATUS TO A MAILER

TECHNICAL FIELD

The present invention relates generally to a postal delivery confirmation service and, in particular, to the United States Postal Service Accountable Mail Services and the USPS Delivery Confirmation electronic service option to the electronic service option mailers.

BACKGROUND OF THE INVENTION

Presently, the United States Postal Service (USPS) provides a delivery confirmation service option to allow a mailer to receive delivery status information on the Internet. When mailing a mail piece, the mailer can provide a barcode, representing a Package Identification Code (PIC) on a shipping label or use a pre-printed barcode label provided by the USPS. The PIC used for delivery confirmation, which has been standardized by the USPS, contains (1) a two-digit application identifier code; (2) a two-digit service type code; (3) a nine-digit D-U-N-S number; (4) an eight-digit package sequence number; and (5) a one-digit check number. The application identifier code is used to denote that delivery confirmation service is required for the package. The service type code is used to describe the product and service type, such as Priority Mail, or Standard Mail (B). The D-U-N-S number is assigned to the mailer by the Dun & Bradstreet Corporation. The package sequence number is assigned by the mailer to each package. The check number is used to detect errors resulting from manual data entry or errors from data transmission.

All the mailer has to do is affix the shipping label containing the barcode to the package; drop the package in any USPS mailbox or postal facility; electronically send a shipping file including the PIC to the USPS; and obtain the delivery status information on the Internet. The shipping file should contain a header record to identify the mailer and a detail record for each mailed package. When the package is delivered, the barcode on the shipping label is scanned by the mail carrier and the delivery status information is sent to a USPS data center for processing. From the USPS Web site, the delivery status information can be accessed by performing individual package inquiries. As for the electronic service option mailer, the delivery status information can be accessed from a daily file containing scanning information on the packages from the previous day. The information provided by the USPS includes date and time of delivery, ZIP code and whether delivery was made, attempted, forwarded or returned.

To use the delivery confirmation service by the USPS, the mailer must have access to the Internet and own a personal computer or other type of computer. Furthermore, the mailer must have means to prepare the shipping file and electronically to send the shipping file to the USPS.

It is advantageous and desirable to provide a delivery confirmation service to a mailer without requiring the mailer to have access to the Internet or to own a computer.

SUMMARY OF THE INVENTION

The present invention provides a method and system for providing a delivery status confirmation service to a mailer who uses a postage meter with a modem, and Pitney Bowes Inc. Postage By Phone® postage meter and meter resetting service to pay the postage for mailing a mail piece. Without any additional cost to the mailer, the mailer may obtain the delivery status of the mail piece without generating or sending a shipping file to the USPS data center as required by the USPS Accountable Mail Services. Furthermore, the mailer is not required to have access to the Internet or to download delivery information from the USPS to a computer.

The method, according to the present invention, uses a data processing center or, more specifically, a Postage By Phone® data center as an interface between the USPS data center and the mailer who uses a postage meter capable of sending electronic data to the Postage By Phone® data center. Based upon the information gathered by the postage meter, the Postage By Phones data center generates the necessary electronic file identifying the mail piece and the mailer, and then sends the electronic file to the USPS. When the mail piece is delivered, the mail carrier scans the barcode on the mail piece. With such scanning, a confirmation message is sent to the USPS data center. Upon receiving the confirmation message relayed from the USPS data center, the Postage By Phone® data center sends the same message to the mailer. In order to receive the delivery status information, the mailer may make a telephone call or send a facsimile to the Postage By Phone® data center, or request that the delivery confirmation be sent to the mailer by facsimile, or to the mailer's computer.

The method and system of the present invention takes advantage of the fact that a postage meter, such as a SPARK (F900) Postage Meter manufactured by Pitney Bowes Inc. of One Elmcroft Road, Stamford, Conn., may retrieve the PIC information and automatically transmit the PIC information along with the meter number and other postage related information to the Postage By Phone® data center. The SPARK (F900) may contain a scale that provides postal information.

Accordingly, the first aspect of the present invention is a method for providing a postal delivery confirmation service in accordance with the USPS Accountable Mail Services to a mailer who uses a postage meter to pay the postage for mailing a mail piece to a destination address, wherein the postage meter has a unique meter number associated with the mailer. The method comprises the steps of providing an identification code to identify the mail piece; inputting the identification code into the postage meter; the postage meter relaying the identification code to a data processing center; the data processing center sending a shipping file containing information related to the identification code to a USPS data center; creating and transferring delivery status information to the USPS data center when the mail piece is delivered to the destination address; the data processing center receiving delivery status information of the mail piece from a USPS data center; and the data processing center relaying delivery status information to the mailer.

The second aspect of the present invention is a system for providing a postal delivery confirmation service in accordance with the USPS Accountable Mail Services or the USPS Delivery Confirmation electronic service option to a mailer who uses an identification code for mailing a mail piece. The system comprises a postage meter electronically linked to a data processing center; a device for inputting the identification code into the postage meter; and a device for receiving delivery status information regarding the mail piece. In the above system, the postage meter electronically sends the identification code to the data processing center which generates a shipping file containing information related to the identification code and electronically sends the shipping file to a USPS data center, and the data processing center obtains the delivery status information from the USPS data center and relays the delivery status information to the receiving device.

A postage meter, the Postage By Phone® data center and a Voice Response Unit (VRU) have been used for meter refill purposes. The Postage By Phone® data center places a message containing the delivery status information in the VRU messaging data base which may be accessed by a mailer via telephone or personal computer.

The third aspect of the present invention is a procedure for providing a postal delivery confirmation service in accordance with a USPS delivery confirmation service to a mailer who uses a postage meter for printing a postage indicia on a mail piece for mailing the mail piece to a destination address and an identification code to identify the mail piece, said procedure comprising the steps of (a) the mailer selecting a class of mail for the mail piece to be delivered to the destination address; (b) the mailer selecting a service level regarding mailing of the mail piece; (c) inputting the identification code into the postage meter; (d) the meter sending a record containing the identification code to a Postage By Phone® data center; (e) the Postage By Phone® data center sending the record to the USPS; (f) the Postage By Phone® data center retrieving the delivery status of the mail piece from the USPS; and (g) the Postage By Phone® data center relaying the delivery status to the mailer.

Additionally, the above disclosed procedure may comprise the steps of (h) the mailer providing the destination address to the postage meter; and (i) the postage meter validating the destination address.

The method and system for providing a delivery confirmation service to a mailer, according to the present invention, will become apparent upon reading the description taken in conjunction with FIGS. 1–6.

DETAILED DESCRIPTION

Figure 1:
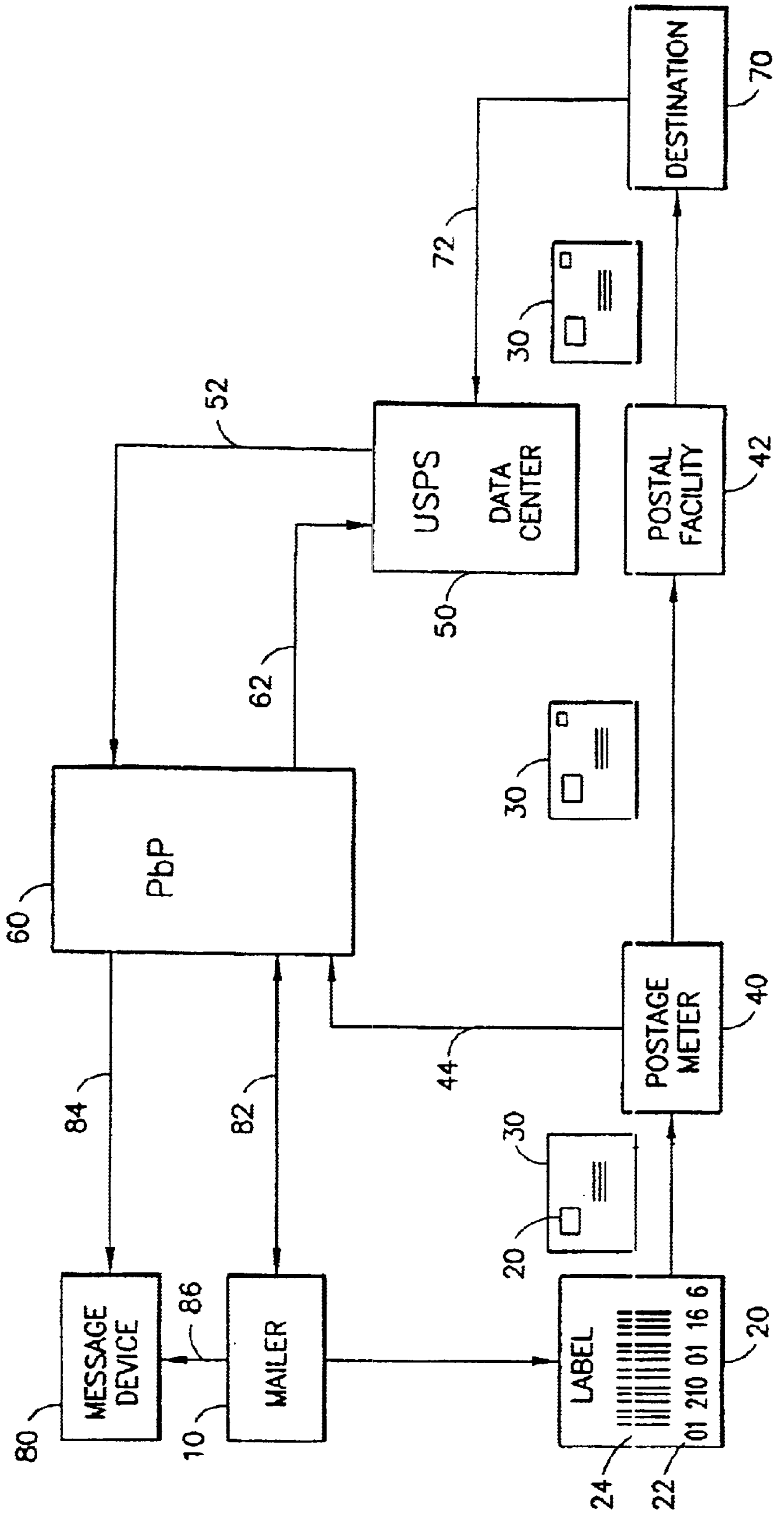
FIG. 1 is a block diagram showing the overall flow of the method and system for providing the delivery confirmation service.

FIG. 1 shows a mailer 10 who uses a shipping label 20 for mailing a mail piece 30. The mailer 10 uses a postage meter 40 to pay the postage for mailing. The label 20 can be generated by the mailer 10, or obtained from a Postal Office which provides a free, pre-printed shipping label by the USPS. The label 20 can also be a special label having a code understood by the postage meter 40. The shipping label 20 contains a Package Identification Code (PIC) 22 and a barcode 24 representing the PIC 22. If the label 20 is a pre-printed label provided by the USPS, then the PIC 22 contains: (1) a two-digit application identifier code; (2) a two-digit service type code; (3) a nine-digit D-U-N-S number (4) an eight-digit package sequence number; and (5) a one-digit error check number. The D-U-N-S number is assigned to the mailer by the Dun & Bradstreet Corporation. If the label 20 is a special label having a special code understood by the postage meter, it is preferred that the D-U-N-S number be replaced by a meter number, and the special code contained a service code allocated to meter business (see FIG. 4).

The postage meter 40 is linked electronically to a data processing center, such as a Postage By Phone® data center 60. With adequate postage provided on the mail piece 30, the mailer 10 submits the mail piece 30 directly or indirectly to a USPS postal facility.

Separately, the postage meter 40 sends information 44 related to the PIC 22 to the Postage By Phone® data center 60. The Postage By Phone® data center 60 generates a shipping file 62 containing a package identification code in compliance with the requirements as set forth by the USPS regarding the USPS Accountable Mail Services or the USPS Delivery Confirmation electronic service option. The Postage By Phone® data center 60 sends the shipping file 62 to the USPS data center 50. When the mail piece 30 is delivered to the destination address 70, the barcode 24 on the shipping label 20 is scanned and the information 72 containing delivery status is sent to the USPS data center 50. By correlating the shipping file 62 to the delivery status information 72, the USPS data center 50 generates a message 52 containing delivery status of the mail piece 30. The message 52 is accessible to the Postage By Phone® data center 60. After receiving the message 52, the Postage By Phone® data center 60 places the delivery status message 52 in a database which is accessible by the mailer 10. The mailer 10 can make a telephone call 82 to the Postage By Phone® data center 60 to retrieve the delivery status message 52. Alternatively, the mailer 10 can request that the message 52 be sent to a message device 80 specified by the mailer 10. For example, the message device 80 can be a facsimile machine, a personal computer, a telephone set, an answering machine, a voice mail device, or a message displaying device.

Figure 2:
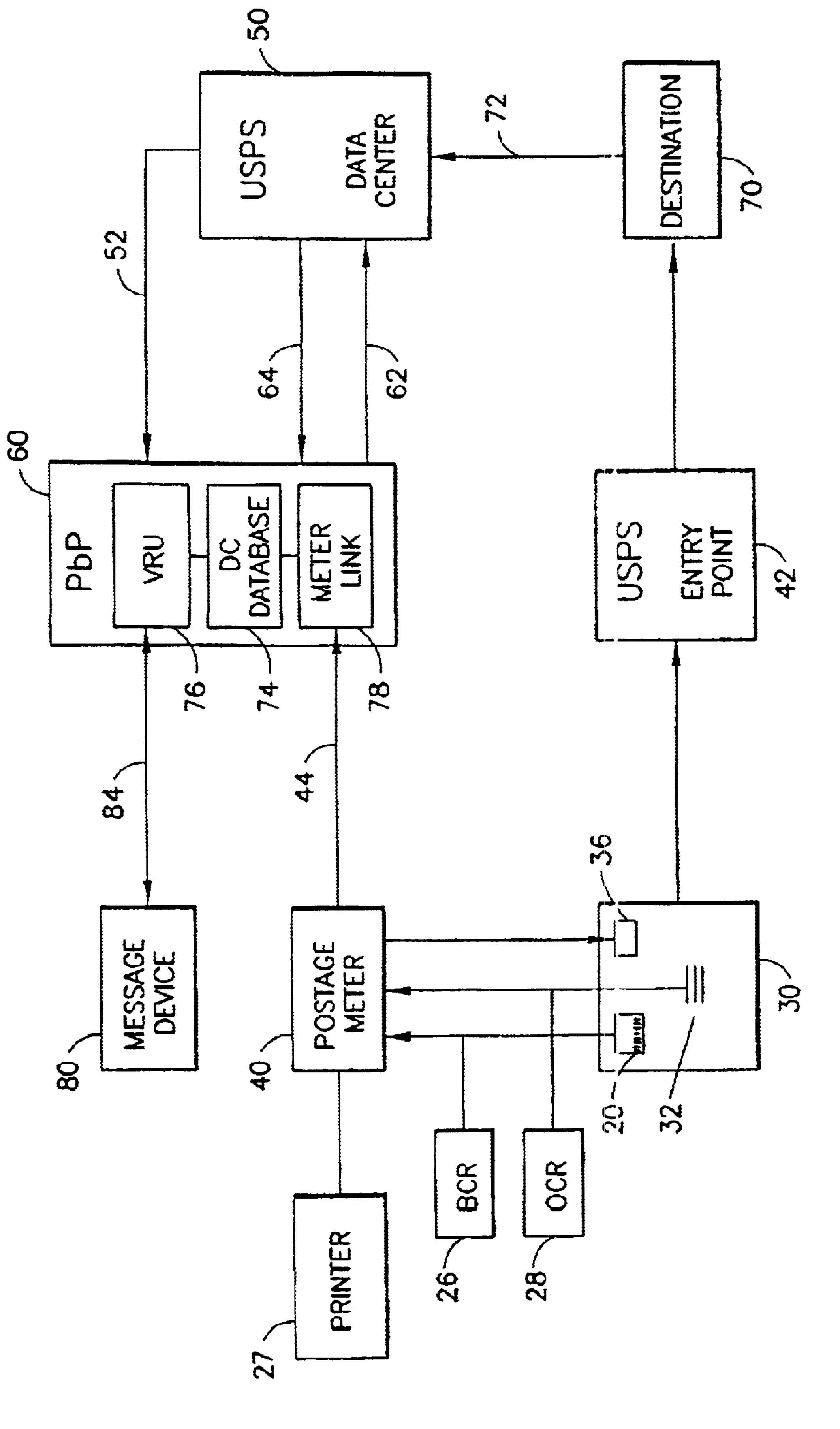
FIG. 2 is a block diagram showing a more detailed flow of the procedure in providing the delivery confirmation service.

As shown in FIG. 2, the mail piece 30 contains a shipping label 20, a destination address 32 and a postage indicia 36 produced by the postage meter 40. The PIC 22 (see FIG. 1) on the shipping label 20 can be manually inputted into the postage meter 40. It is possible that a code reader such as a barcode reader (BCR) 26, which is electronically linked to the postage meter 40, can be used to read and send the PIC 22 to the postage meter 40. The destination address 30 can be manually inputted into the postage meter 40. It is possible to use a text scanner such as an Optical Character Recognition device (OCR) 28 to read the destination address 32 and send the same to the postage meter 40. It is also possible to use a printer 27 operatively connected to the postage meter 40 to print the PIC 22 and/or the destination address 30 and directly input the PIC to the postage meter 40. The mail piece 30 can be dropped off at any USPS postal facility or entry point 42. In the Postage By Phone® data center 60, a meter link 72 is provided for receiving data from the postage meter 40; a delivery confirmation database 74 is provided for storing information related to the PIC 22 and the delivery status information 52 provided by the USPS data center 50; and a VRU messaging database 76 is used to provide data access to the mailer 10. Preferably, the Postage By Phone® data center 60 validates information 44 sent by the postage meter 40, including parameters such as the meter number, date, time sequence, D-U-N-S number (if present), validity of the ZIP code of the destination address 32, and so forth. The Postage By Phone® data center 60 sorts files regarding information 44 by the ZIP code of the entry point 42 and creates a batch file per entry point 42, for example. Preferably, the shipping file 62 for any mail piece 30 that contains invalid parameters is not sent to the USPS data center 50. Instead, a record regarding the mail piece 30 containing invalid parameters is moved to a VRU mailer report/edit process. The VRU reports any records that need correction by the mailer 10. Upon receiving correction from the mailer 10, the VRU submits a corrected shipping file 62 to the USPS data center 50.

The VRU reports any delivery confirmation updates via the message device 80 to the mailer 10. To receive a confirmation report, the mailer 10 can request that a facsimile be sent to a specified facsimile machine, an e-mailed version of the report be sent to a specified e-mail address, a mailed report delivered to a specified mailing address, or a voice-mail version of the report be sent to a specified voicemail receiving address. The confirmation report can also be sent to the mailer's pager. Preferably, the Postage By Phone® data center 60 archives all reports for the mailer 10 for one year, for example.

Figure 3:
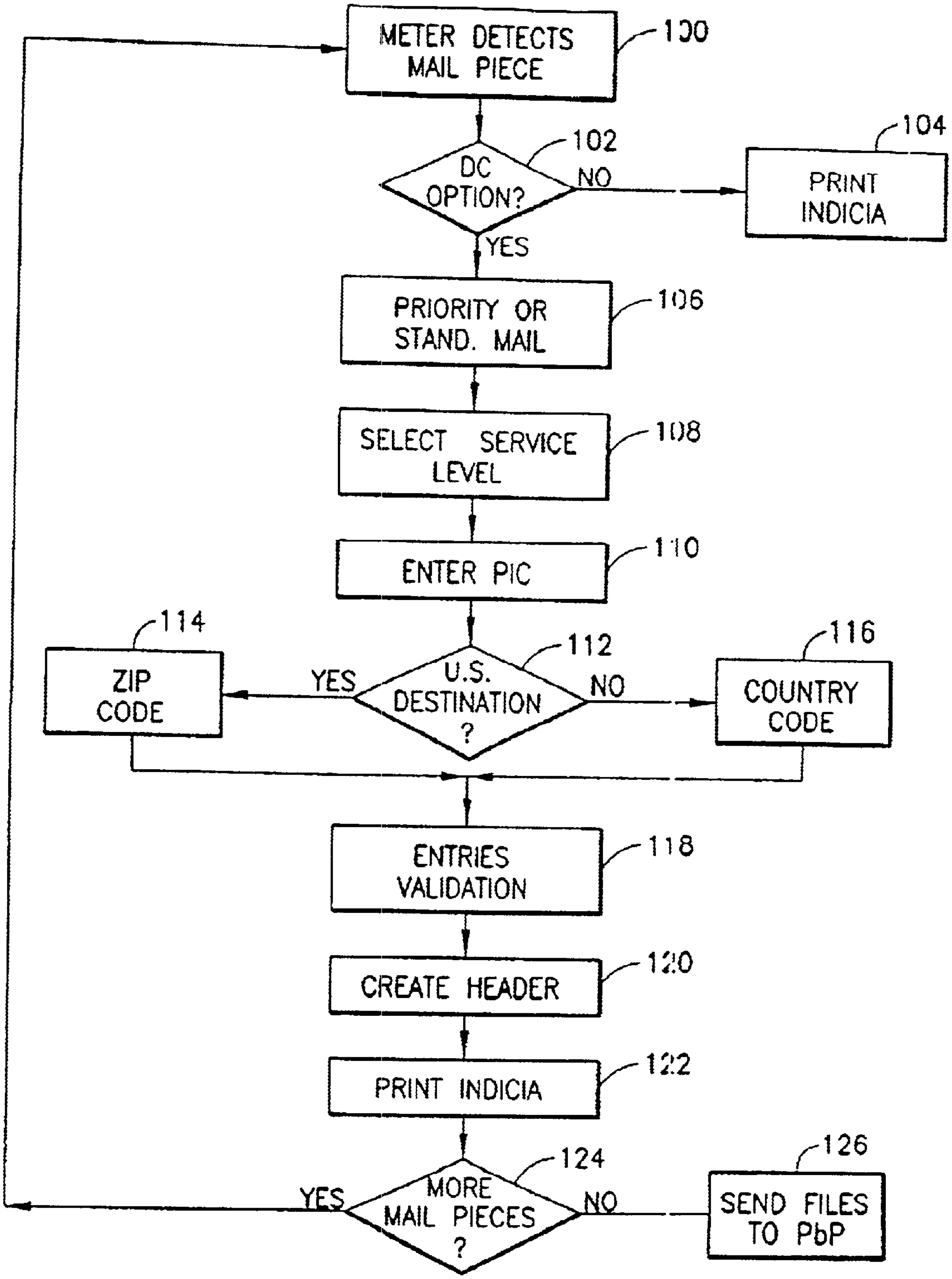
FIG. 3 is a flow chart describing an information gathering procedure at a postage meter.

When a mailer 10 wishes to use a postage meter 20 for mailing, he or she may be asked to provide a range of information regarding delivery services. For example, the mailer 10 is asked to provide the destination address 32 including the ZIP code for domestic mail or the country code for international mailing. The mailer 10 may be required to select a service level. If the mailer wishes to use the delivery confirmation services, he or she may be required to specify the class of mailed desired, such as Priority, First-Class or Standard Mail (B). The meter-based mail delivery confirmation process is illustrated in FIG. 3.

As shown at block 100, when the postage meter 40 detects the presence of a mail piece 10 (see FIGS. 1 and 2), the mailer 10 is asked in block 102 if Delivery Confirmation service is desired. If the answer is no, the postage meter 40 considers the mail piece 10 regular mail and provides a postage indicia for regular mailing at block 104. If the answer is yes, the postage meter 40 prompts with Priority or Standard Mail (B)? at block 106 and waits for an answer. The mailer 10 is then asked to select the service level at block 108 and to enter the Package-Identification-Code 22 on the shipping label 20 (see FIG. 1) at block 110. At block 112, the mailer 10 is asked whether the mail piece 30 is destined to a domestic address or to an overseas address. If the destination is within the U.S., then a ZIP code is entered at block 114. Otherwise a country code is entered at block 116. At block 118, the postage meter 40 validates all the entries provided by the mailer 10 at blocks 106 through 116. After all the entries are validated, the postage meter 40 creates a header for record regarding the mail piece 30 and store the header in the postage meter 40 at block 120. Subsequently, the postage meter 40 produces a postage indicia 36 for the mail piece 30 at block 122. At block 124, the mailer 10 is asked whether there is more mail to be processed. If there is no more mail to be processed, the postage meter 40 sends an electronic file containing one or more headers and other postage related information to the Postage By Phone® data center 60 at block 126. If the mailer 10 has more mail to process, the loop goes back to block 100.

Additionally, after the postage meter 40 sends the electronic file to the Postage By Phone® data center 60, the display on the postage meter 40 may say "DC file sent to Postage By Phone®, please wait for Postage By Phone® confirmation of data". At the same time, the Postage By Phone® data center 60 validates the file to check and append the meter serial number, the date, the time sequence, the D-U-N-S number if present, and the validity of the ZIP code or country code. If any of the entries is invalid, the meter display prompts the mailer 10 to correct the invalid entry. When all the entries are validated, the Postage By Phone® data center 60 returns a RECORD ACCEPTED message to the postage meter 40, for example.

Figure 4A:
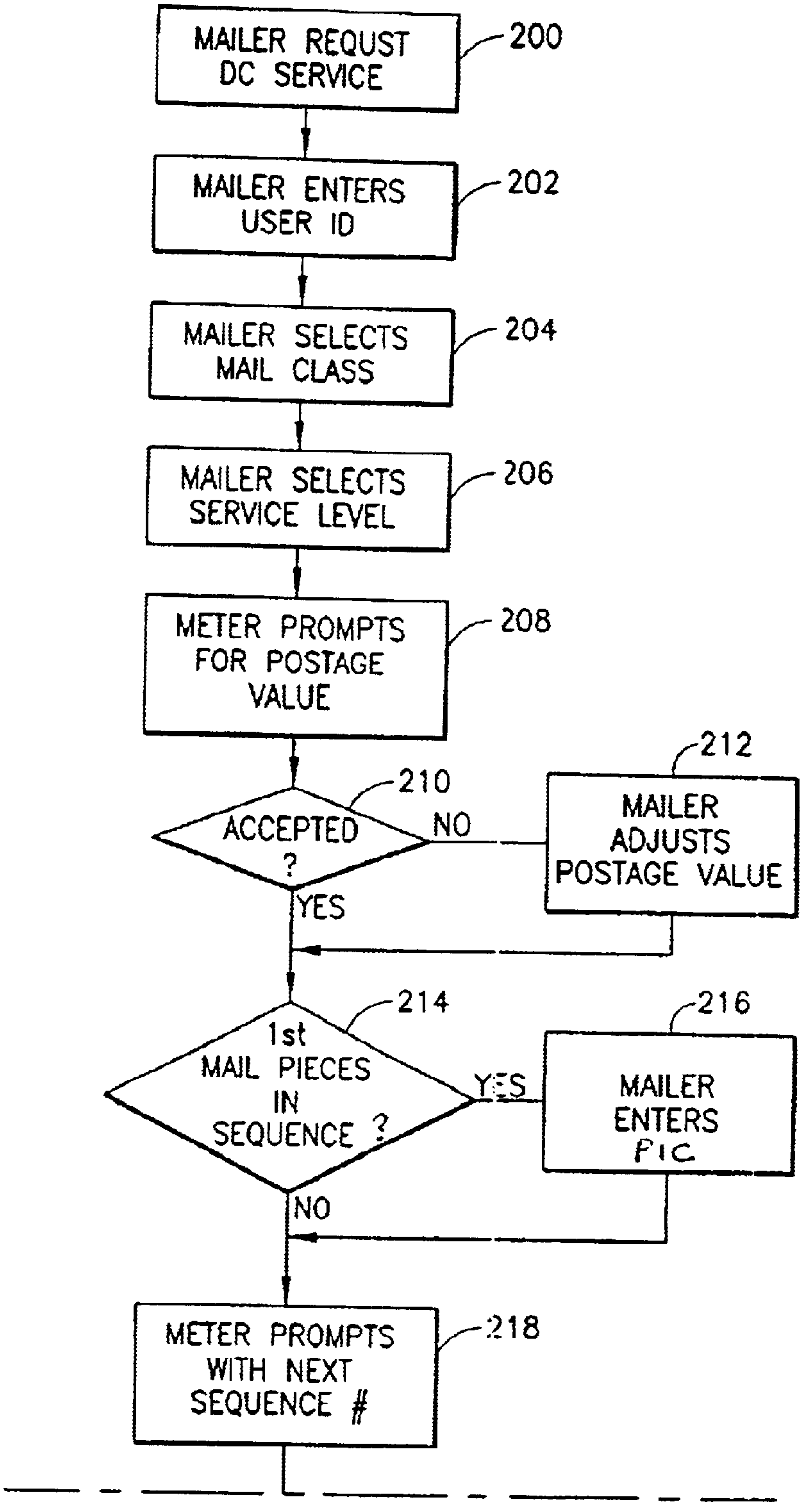
FIG. 4 is a flow chart describing a more detailed process flow regarding the information gathering procedure at the postage meter.
Figure 4:
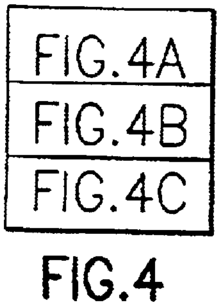
Figure 4B:
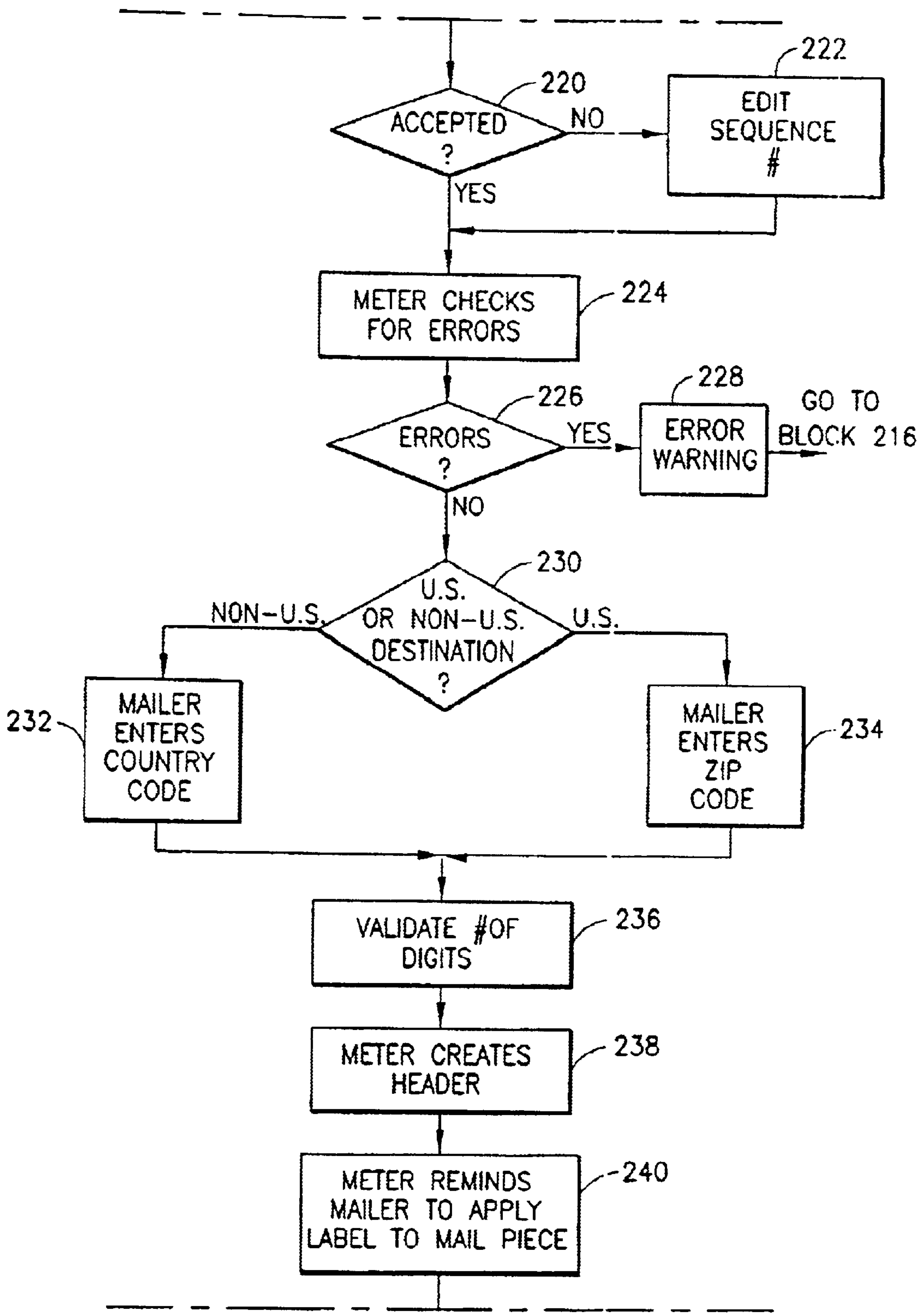
Figure 4C:
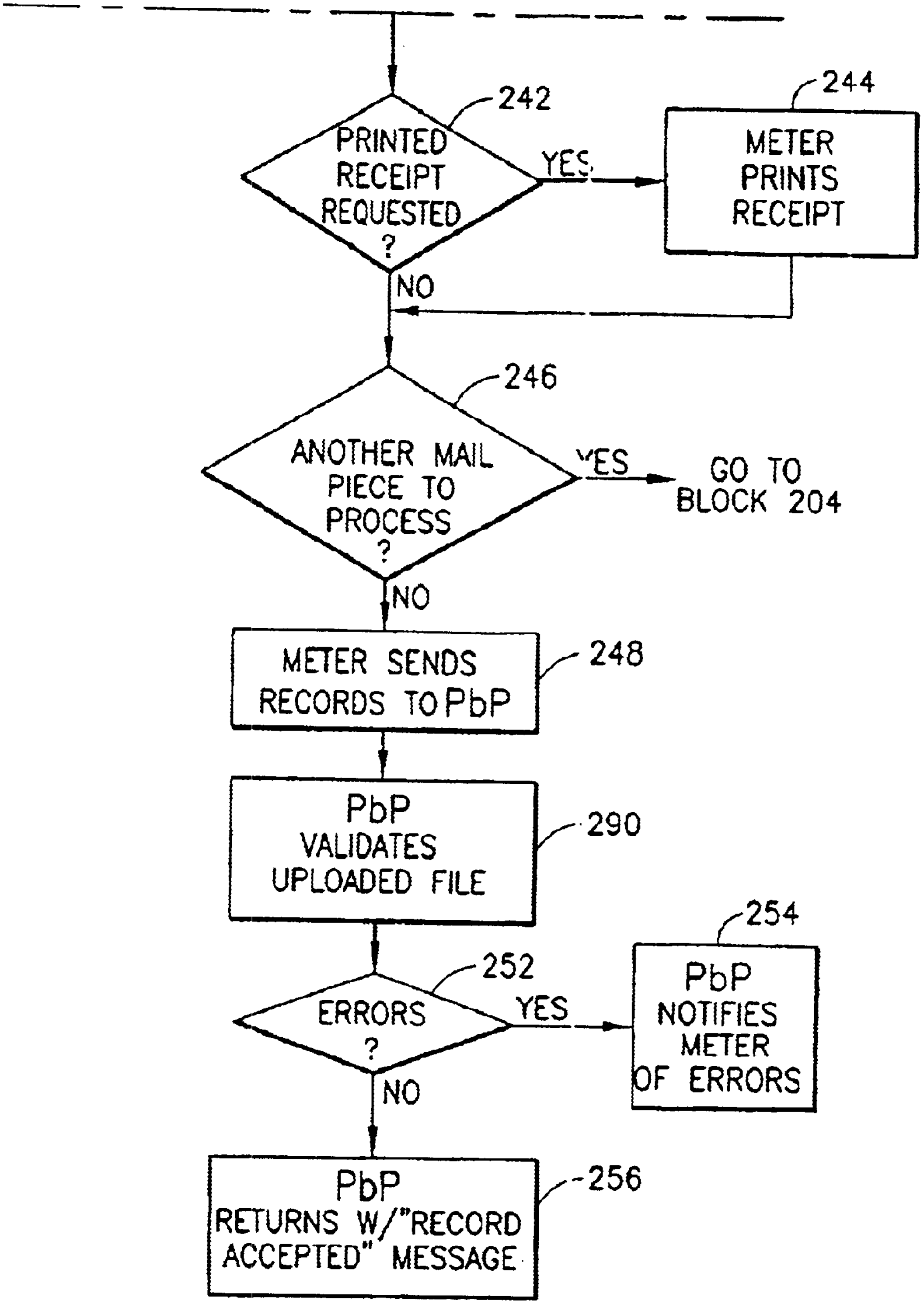

A more detailed process flow is illustrated in FIG. 4. As shown at block 200, the mailer requests Delivery Confirmation (DC) service which provides a pre-printed shipping label to the mailer and notifies the Postage By Phone® 60 to set up an account for the mailer. At block 202, the mailer is asked to enter the user identification number such as the mailer's D-U-N-S number into the postage meter if needed. At block 204, the postage meter prompts with Priority or Standard Mail (B) display, for example. At prompt, the mailer selects the desired class for the mail piece. At block 206, the mailer selects the mail piece service level from a menu provided on the postage meter. At block 208, the postage meter prompts with the corresponding postage value, such as $3.20 for Priority Mail. If the mailer does not accept the prompted postage value, the mailer can adjust the postage value as needed, as shown at block 212. Note that the PIC 22 as shown in FIG. 1 contains an eight-digit package sequence number. This sequence number can be increased automatically by 1 by the postage meter whenever the next mail piece is processed. Furthermore, the difference between the PIC 22 for one mail piece from another mail piece in the same batch is the package sequence number. Thus, the Package Identification Number of the mail piece is only required to be entered when starting a new batch of mail processed by the postage meter. At block 216, the mailer is asked to enter the PIC or barcode as shown on the pre-printed shipping label on the mail piece only if the mail piece is the first one in a new batch. The postage meter prompts with the next sequence number in a pre-established sequence, as shown at block 218. If the mailer does not accept the sequence number, he or she may edit the sequence number at block 222. At block 224, the postage meter performs a check sum check on the number entered and warns the user if an error occurs. For mailing to a U.S. address, the mailer is required to enter the ZIP code, at block 234. Otherwise, the mailer is required to enter the country code of the non-U.S. destination address, as shown at block 232. At block 236, the postage meter validates the number of digits of the ZIP code or country code entered. The postage meter creates a header record at block 238, adding the postage meter number, the date, the time, the user D-U-N-S number or any other identification number, as needed. The record is checked and stored. At this stage, the postage meter prompts the user to apply the pre-printed label to the mail piece, as shown at block 240. The postage meter then asks "printed receipt requested" at block 242. If a receipt is desired, the mailer inserts a tape/card/envelope for the postage meter to print the date, the time, the postage meter number, the package identification number, the destination ZIP code, and the service level, as shown at block 244. At this stage, the processing of the mail piece by the postage meter is completed. The postage meter asks "another mail piece to process?". If the answer is yes, the process step goes back to block 204 and the mailer is asked to select the mail class. If no more mail pieces are to be processed, the postage meter sends the stored records to the Postage By Phone® data center in sequence one at a time, as shown at block 248. At the same time, the postage meter annunciates "DC file sent to Postage By Phone®, please wait for Postage By Phone® confirmation of data", for example. Upon receiving records from the postage meter, the Postage By Phone® data center validates the uploaded files. The Postage By Phone® data center further checks and appends the postage meter serial number, the date, the time sequence, the user identification, the validity of the ZIP code etc., as shown at block 250. If the Postage By Phone® data center detects an error, the meter is notified of the error at block 254. For example, if an invalid ZIP code is entered, the postage meter display prompts the mailer to correct the ZIP code. If no error is detected, the Postage By Phone® data center may add any other required data to the file header.

The Postage By Phone® data center returns a "RECORD ACCEPTED" message to the postage meter, as shown at block 256.

Figure 5:
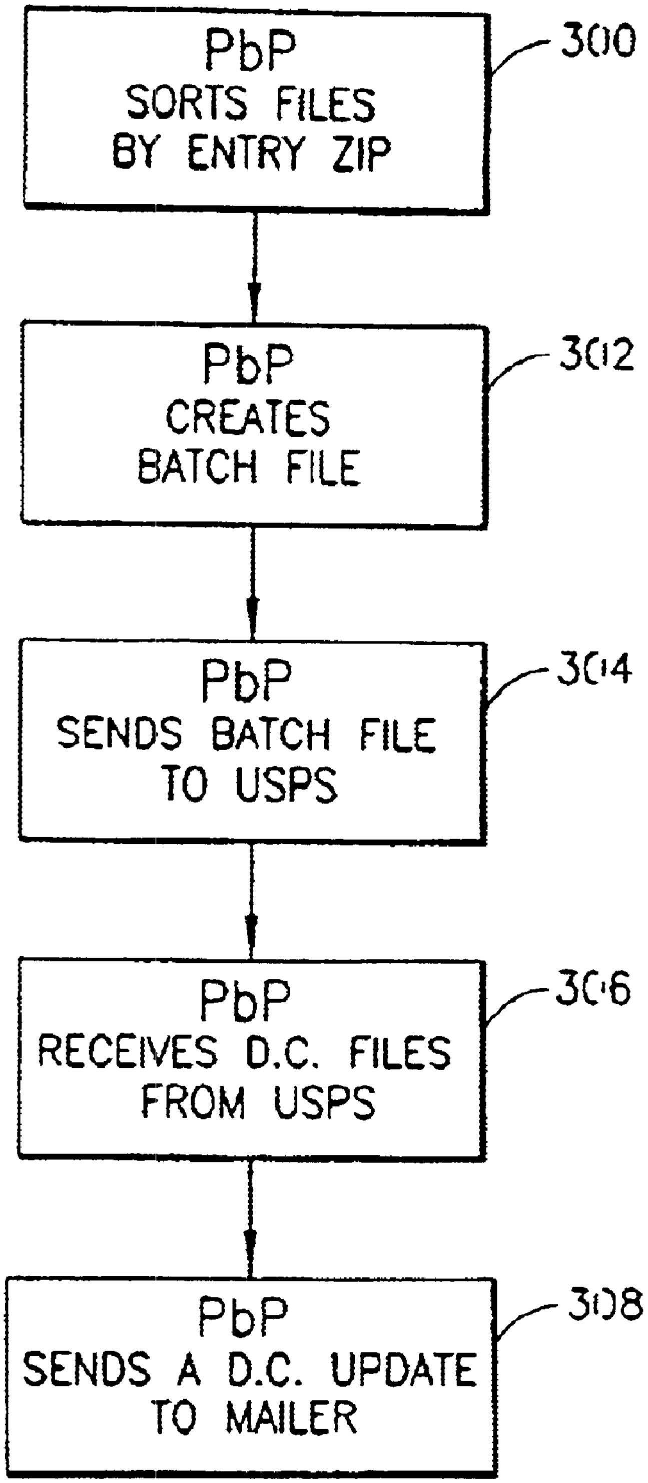
FIG. 5 is a flow chart describing the delivery confirmation process with regard to a Postage By Phone® data center.

It is understood that after the postage meter processes the mail in accordance with the process flow as shown in FIG. 4, the mailer drops off the mail at a USPS postal facility. Independently, the Postage By Phone® data center prepares the necessary electronic file in compliance with the requirements as set forth by the USPS regarding the delivery confirmation service. As shown in FIG. 5, the Postage By Phone® data center sorts the uploaded files by the entry ZIP code at block 300; creates a batch file per entry ZIP code at block 302, sends the processed batch or batches to a USPS data center at a desired interval at block 304; requests and receives a new Delivery Confirmation (DC) batch file from the USPS one or more times a day as shown at block 306; and sends a DC update to the mailer at block 308.

There are many ways a mailer can obtain the DC information from the Postage By Phone® data center. For example, the mailer can call the Postage By Phone® VRU for a DC update. The mailer can also request a facsimile to have a DC record sent to the mailer's facsimile. The mailer can also download the DC record file from the Postage By Phone® data center to message device 80 or postage meter 40 etc.

If errors are detected, the Postage By Phone® VRU reports any records that need mailer correction. Accordingly, the mailer uses receipts or other records to correct the errors with the VRU.

Figure 6:
FIG. 6 is an exemplary shipping label having a shipping code that can be understood by a postage meter with PIC capability.

As described above in conjunction with FIG. 1, the mailer 10 can use a special shipping label having a special code understood by the postage meter 40. An exemplary shipping label 21 is shown in FIG. 5. As shown, the shipping label 21 contains a PIC 23 and a barcode 25 representing the PIC 23. The PIC 23 contains a two-digit service type code, a nine-digit PB code which may be related to the meter number, an eight-digit package sequence number and a single-digit error check number. It should be noted that the PIC 23 can contain more or less digits than the code shown in FIG. 6.

Although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of providing a delivery confirmation service to a mailer who uses a postage meter to print a postage indicia which pays the postage for mailing a mail piece having a package identification code and containing a destination address, said method comprising the steps of:

a) inputting the package identification code into the postage meter;

b) relaying the package identification code and postage meter information which includes the destination address to a meter refill data center;

c) processing the package identification code and the postage meter information to create a record at the meter refill data center;

d) transmitting an electronic file containing the processed information regarding the package identification code and other postage meter information from the meter data center to a carrier;

e) depositing the mail piece in a postal entry point;

f) scanning the package identification code when the mail piece is delivered to the destination address;

g) receiving at a carrier data center the information scanned at the destination address;

h) receiving delivery status information from the carrier at the meter refill data center;

i) storing the delivery status information at the meter refill data center; and j) retrieving the stored information at the meter refill data center using the package identification code scanned at the destination address and the stored delivery status information upon mailer's request via the meter refill system.

2. The method of claim 1, wherein the retrieving step may be performed by voice.

3. The method of claim 1, wherein the retrieving step may be performed by pager.

4. The method of claim 1, wherein the retrieving step may be performed by facsimile.

5. The method of claim 1, wherein the retrieving step may be performed by personal computer.

6. The method of claim 1, wherein the identification code is machine-readable and the inputting step comprises the step of reading the identification code.

7. The method of claim 1, wherein the inputting step is carried out manually.

8. The method of claim 1 further comprising the steps of:

k) creating a header record to identify the mailer; and l) including the header record in the electronic file to be sent to the carrier.

9. The method of claim 4, wherein the postage meter has a meter number, and the header record contains the meter number.

10. The method of claim 1, further including the step of providing the destination address ZIP code to the meter in order to add the ZIP code to the electronic files.

11. The method of claim 1, wherein the identification code contains a two-digit application identifier code, a two-digit service type code, a nine-digit D-U-N-S number, an eight-digit package sequence number, and a one-digit error check code.

12. The method of claim 1, wherein the identification code is pre-printed.

13. The method of claim 1, wherein the identification code is provided by the carrier.

14. The method of claim 1, wherein the identification code is printed by a printer operatively connected to the postage meter.

15. The method of claim 1, wherein the identification code comprises a barcode, said inputting step comprising the step of scanning the barcode.

16. The method of claim 1, wherein the retrieving step may be performed by the meter.

* * * * *